(12) United States Patent
Liu

(10) Patent No.: US 11,391,979 B2
(45) Date of Patent: Jul. 19, 2022

(54) LIQUID CRYSTAL DISPLAY DEVICE

(71) Applicant: Wuhan China Star Optoelectronics Technology Co., Ltd., Wuhan (CN)

(72) Inventor: Fancheng Liu, Wuhan (CN)

(73) Assignee: Wuhan China Star Optoelectronics Technology Co., Ltd., Wuhan (CN)

( * ) Notice: Subject to any disclaimer, the term of this patent is extended or adjusted under 35 U.S.C. 154(b) by 0 days.

(21) Appl. No.: 16/488,608

(22) PCT Filed: May 27, 2019

(86) PCT No.: PCT/CN2019/088475
§ 371 (c)(1),
(2) Date: Aug. 26, 2019

(87) PCT Pub. No.: WO2020/220419
PCT Pub. Date: Nov. 5, 2020

(65) Prior Publication Data
US 2022/0043295 A1 Feb. 10, 2022

(30) Foreign Application Priority Data

Apr. 30, 2019 (CN) .......................... 201910360348.4

(51) Int. Cl.
*G02F 1/1333* (2006.01)
*G02F 1/1335* (2006.01)
(Continued)

(52) U.S. Cl.
CPC ...... *G02F 1/133382* (2013.01); *G02F 1/1368* (2013.01); *G02F 1/133512* (2013.01);
(Continued)

(58) Field of Classification Search
CPC ................................................ G02F 1/133512
See application file for complete search history.

(56) References Cited

U.S. PATENT DOCUMENTS

| 6,414,740 B1 * | 7/2002 | Hosoyamada ....... G09G 3/3648 349/161 |
| 2006/0055859 A1 | 3/2006 | Jin et al. |

(Continued)

FOREIGN PATENT DOCUMENTS

| CN | 1936625 A | 3/2007 |
| CN | 103926726 A | 7/2014 |

(Continued)

*Primary Examiner* — Sang V Nguyen
(74) *Attorney, Agent, or Firm* — Nathan & Associates; Menachem Nathan

(57) ABSTRACT

A liquid crystal display panel is provided, which includes a color filter substrate including an array of red, green, blue, and white color resistances. An array substrate disposed opposite to the color film substrate. The array substrate includes a plurality of data lines and a plurality of gate lines vertically arranged, the data lines and the gate lines divide the array substrate into a plurality of sub-pixel areas. A liquid crystal layer disposed between the array substrate and the color filter substrate. The white sub-pixel area is provided with a heating layer for heating the liquid crystal layer, which solves the problem that the liquid crystal display panel exhibits undesirable phenomena such as smear due to abnormal liquid crystal state when operating in a low-temperature environment.

16 Claims, 6 Drawing Sheets

(51) Int. Cl.
  *G02F 1/1362*  (2006.01)
  *G02F 1/1368*  (2006.01)
(52) U.S. Cl.
  CPC .. *G02F 1/133514* (2013.01); *G02F 1/136286* (2013.01); *G02F 2201/52* (2013.01)

(56) References Cited

U.S. PATENT DOCUMENTS

| | | | |
|---|---|---|---|
| 2007/0024801 | A1 | 2/2007 | Horiuchi et al. |
| 2010/0073168 | A1* | 3/2010 | Tallent ................ A61B 5/7275 |
| | | | 340/573.1 |
| 2010/0182559 | A1 | 7/2010 | Chang et al. |
| 2015/0138462 | A1* | 5/2015 | Yang ................ G02F 1/133382 |
| | | | 349/21 |
| 2016/0231605 | A1 | 8/2016 | Yu et al. |
| 2017/0131608 | A1* | 5/2017 | Jin ....................... G09G 3/3648 |
| 2018/0032781 | A1* | 2/2018 | Mainguet ............. H03K 17/941 |
| 2019/0353940 | A1* | 11/2019 | Zhao ................ G02F 1/136286 |
| 2020/0073168 | A1* | 3/2020 | Zhao ................... G02F 1/13439 |
| 2020/0201109 | A1* | 6/2020 | Zhao ................ G02F 1/136286 |

FOREIGN PATENT DOCUMENTS

| | | | | |
|---|---|---|---|---|
| CN | 104678668 A | | 6/2015 | |
| CN | 107422515 | * | 12/2017 | ........... G02F 1/1333 |
| CN | 108983476 A | | 12/2018 | |
| CN | 109387962 A | | 2/2019 | |
| KR | 101074395 B1 | | 10/2011 | |

\* cited by examiner

LIQUID CRYSTAL DISPLAY DEVICE

FIELD OF INVENTION

The present application relates to a field of display technologies, and in particular, to a liquid crystal display panel.

BACKGROUND OF INVENTION

Liquid crystal displays rely on liquid crystals therein to display screens. In a working environment with normal temperature, the liquid crystals maintain a normal liquid crystalline structure, have good flowability, and can meet the requirements of normal display screens. When the temperature in the working environment of the liquid crystal displays is too low, viscosity coefficient of the liquid crystals is increased, a threshold voltage is increased, the response speed becomes slower, and causes a phenomenon of dynamic dragging of the display screen. In an environment below minus 40° C., there is even a problem that the liquid crystal is solidified, the liquid crystalline state disappears, and the liquid crystal displays cannot operate.

Therefore, it is necessary to improve the current liquid crystal displays to ensure that the liquid crystal displays can work normally in a low-temperature environment.

TECHNICAL PROBLEM

In the low-temperature environment, the liquid crystals in the liquid crystal displays have problems such as a large viscosity coefficient, a rise in threshold voltage, and a slow response speed, which further causes a problem that the liquid crystal displays display the screens with dynamic dragging or even cannot be displayed.

SUMMARY OF INVENTION

In order to solve the above technical problem, the technical solution of the present application is as follows.

A liquid crystal display panel provided by the present application, including a color filter substrate including a red color resistance, a green color resistance, a blue color resistance, and a white color resistance arranged in an array. An array substrate is disposed opposite to the color filter substrate. The array substrate includes a plurality of data lines and a plurality of gate lines vertically arranged. The data lines and the gate lines divide the array substrate into a plurality of sub-pixel areas. Each of the sub-pixel areas corresponds to one of the red color resistance, the green color resistance, the blue color resistance, and white color resistance disposed on the color filter substrate. One of the sub-pixel areas corresponding to the red color resistance is defined as a first sub-pixel area, one of the sub-pixel areas corresponding to the green color resistance is defined as a second sub-pixel area, one of the sub-pixel areas corresponding to the blue color resistance is defined as a third sub-pixel area, and one of the sub-pixel areas corresponding to the white color resistance is defined as a fourth sub-pixel area. A liquid crystal layer disposed between the array substrate and the color filter substrate. And, the fourth sub-pixel area is provided with a heating layer configured to heat the liquid crystal layer.

In a liquid crystal display panel of the present application, the array substrate includes a substrate, a trace layer disposed on the substrate. The trace layer includes the gate lines, the data lines, and a plurality of thin film transistors connected to the gate lines and the data lines. A first passivation layer is disposed on the trace layer. A first electrode layer is disposed on the first passivation layer and is configured to provide a first electric field. A second passivation layer is disposed on the first electrode layer. A second electrode layer is disposed on the second passivation layer and is configured to provide a second electric field. And, the heating layer is disposed between the first passivation layer and the trace layer.

In a liquid crystal display panel of the present application, the array substrate further includes a plurality of first heating traces and a plurality of second heating traces, each of the first heating traces is disposed in parallel with the gate lines, and each of the second heating traces is disposed in parallel with the data lines.

In a liquid crystal display panel of the present application, a width of the each of first heating traces is less than or equal to a width of a trace area of each of the gate lines, and a width of each of the second heating traces is less than or equal to a width of a trace area of each of the data lines.

In a liquid crystal display panel of the present application, a color filter substrate further includes a black matrix disposed at a boundary between the red color resistance, the green color resistance, the blue color resistance, and the white color resistance, and the black matrix covers the trace area of each of the gate lines and the trace area of each of the data lines.

In a liquid crystal display panel of the present application, the first heating traces, the second heating traces, and the heating layer are in the same layer of the array substrate.

In a liquid crystal display panel of the present application, the heating layer completely covers the fourth sub-pixel area.

In a liquid crystal display panel of the present application, the first heating traces go through a display area of the liquid crystal display panel, and the second heating traces are disposed along an edge of the heating layer and are connected between two adjacent first heating traces.

In a liquid crystal display panel of the present application, the heating layer partially covers the fourth sub-pixel area.

In a liquid crystal display panel of the present application, the first heating traces go through a display area of the liquid crystal display panel, the second heating traces are disposed along an edge of the heating layer and are connected to the heating layer, and at least one end of each of the second heating traces is connected to each of the first heating traces.

In a liquid crystal display panel of the present application, further including a heating control module, and the heating layer, the first heating traces, and the second heating traces are connected to the heating control module.

In a liquid crystal display panel of the present application, the heating control module is disposed in a non-displaying area of the liquid crystal display panel.

In a liquid crystal display panel of the present application, further including a temperature sensor configured to detect a temperature of the liquid crystal layer.

In a liquid crystal display panel of the present application, the temperature sensor is connected to the heating control module, and the heating control module is configured to control the heating layer, the first heating traces, and the second heating traces to perform a heating operation according to a temperature data detected by the temperature sensor.

In a liquid crystal display panel of the present application, the temperature sensor is disposed between the liquid crystal layer and the color filter substrate.

In a liquid crystal display panel of the present application, sides of the heating layer, the first heating traces, and the second heating traces facing the liquid crystal layer are black.

In a liquid crystal display panel of the present application, each of the thin film transistors is disposed in the fourth sub-pixel area.

In a liquid crystal display panel of the present application, a vertical projection of the heating layer on the trace layer does not coincide with an area occupied by the thin film transistors on the trace layer.

In a liquid crystal display panel of the present application, materials of the heating layer, the first heating traces, and the second heating traces are metal.

Beneficial Effect

In the present application, a heating layer is disposed on a region corresponding to the white resistance on the array substrate, and a first heating traces and a second heating traces respectively parallel to the gate lines and the data lines are disposed on the array substrate. The heating layer, the first heating traces, and the second heating traces form a uniform heating zone, thereby achieving a uniform and rapid heating of the liquid crystal layer of the liquid crystal display panel, and ensuring the liquid crystal display panel can be quickly started in a low-temperature environment and displayed normally.

BRIEF DESCRIPTION OF FIGURES

In order to illustrate the technical solutions of the present disclosure or the related art in a clearer manner, the drawings desired for the present disclosure or the related art will be described hereinafter briefly. Obviously, the following drawings merely relate to some embodiments of the present disclosure, and based on these drawings, a person skilled in the art may obtain the other drawings without any creative effort.

DETAILED DESCRIPTION OF EMBODIMENTS

Figure 1:
FIG. 1 is a schematic structural diagram of a liquid crystal display panel according to an embodiment of the present application.

The following description of each embodiment, with reference to the accompanying drawings, is used to exemplify specific embodiments which may be carried out in the present invention. Directional terms mentioned in the present invention, such as "top", "bottom", "front", "back", "left", "right", "inside", "outside", "side", etc., are only used with reference to the orientation of the accompanying drawings. Therefore, the used directional terms are intended to illustrate, but not to limit, the present invention. In the drawings, components having similar structures are denoted by the same numerals.

A liquid crystal display panel provided by an embodiment of the present application, including a color filter substrate, an array substrate disposed opposite to the color filter substrate, and a liquid crystal layer between the color filter substrate and the array substrate. The color filter substrate includes red (R), green (G), Blue (B), white (W) four-color resistances. A region corresponding to the white resistance on the array substrate is provided with a heating layer, and the heating layer can heat the liquid crystal layer to prevent dynamic dragging displaying and abnormal displaying when the liquid crystal display panel is operating in a low-temperature environment.

The following detailed description with reference to the accompanying drawings and an operation principle of a structure of a liquid crystal display panel according to an embodiment of the present application.

As shown in FIG. 1, a schematic structural diagram of the liquid crystal display panel according to an embodiment of the present application. The liquid array crystal display panel includes a color filter substrate 11 and an array substrate 12 disposed opposite to the color filter substrate 11, and a liquid crystal layer 13 disposed between the color filter substrate 11 and the array substrate 12.

Figure 2:
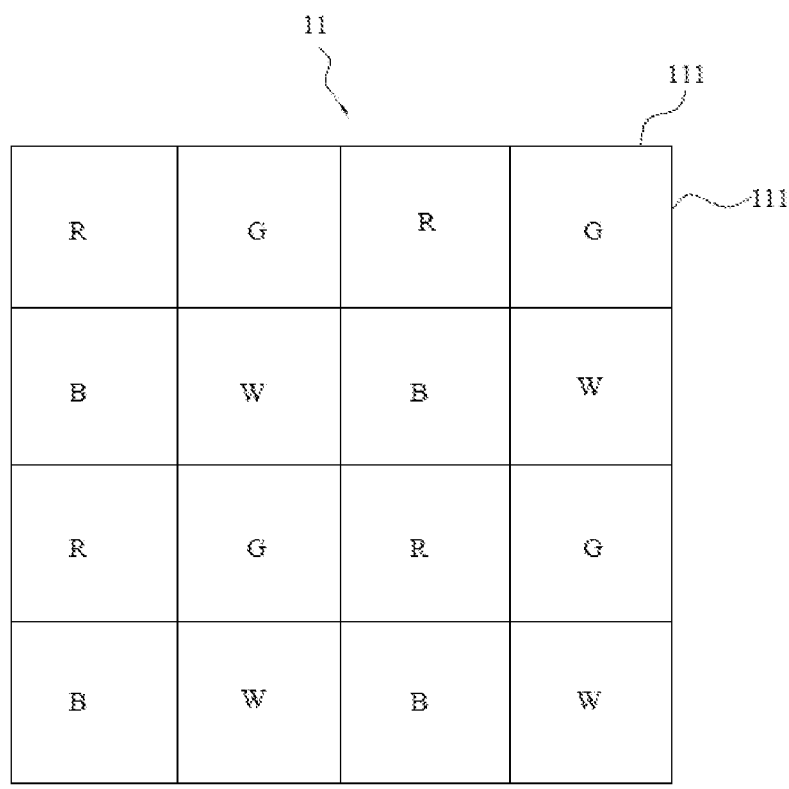
FIG. 2 is a schematic structural diagram of a color filter substrate according to an embodiment of the present application.

As shown in FIG. 2, the color filter substrate 11 includes four color resistances of red R, green G, blue B, and white W, and the four color resistances are arranged in an array on the color filter substrate 11. Alternatively, the four color resistances can be arranged in a rectangular array on the substrate 11 as shown in FIG. 2. Alternatively, the four color resistances can be arranged in a horizontal or a vertical arrangement on the color filter substrate, that is, the color resistances of each line of the color filter substrate 11 can be arranged in an order of red, green, blue, and white, or the color resistances of each column can be arranged in an order of red, green, blue, and white. The present application does not limit the arrangement of the four color resistances.

It should be noted, each boundary of the four color resistances is spaced by a black matrix 111 to prevent displaying abnormalities occurred at the boundary of the four color resistances due to the double color resistances.

Figure 3:
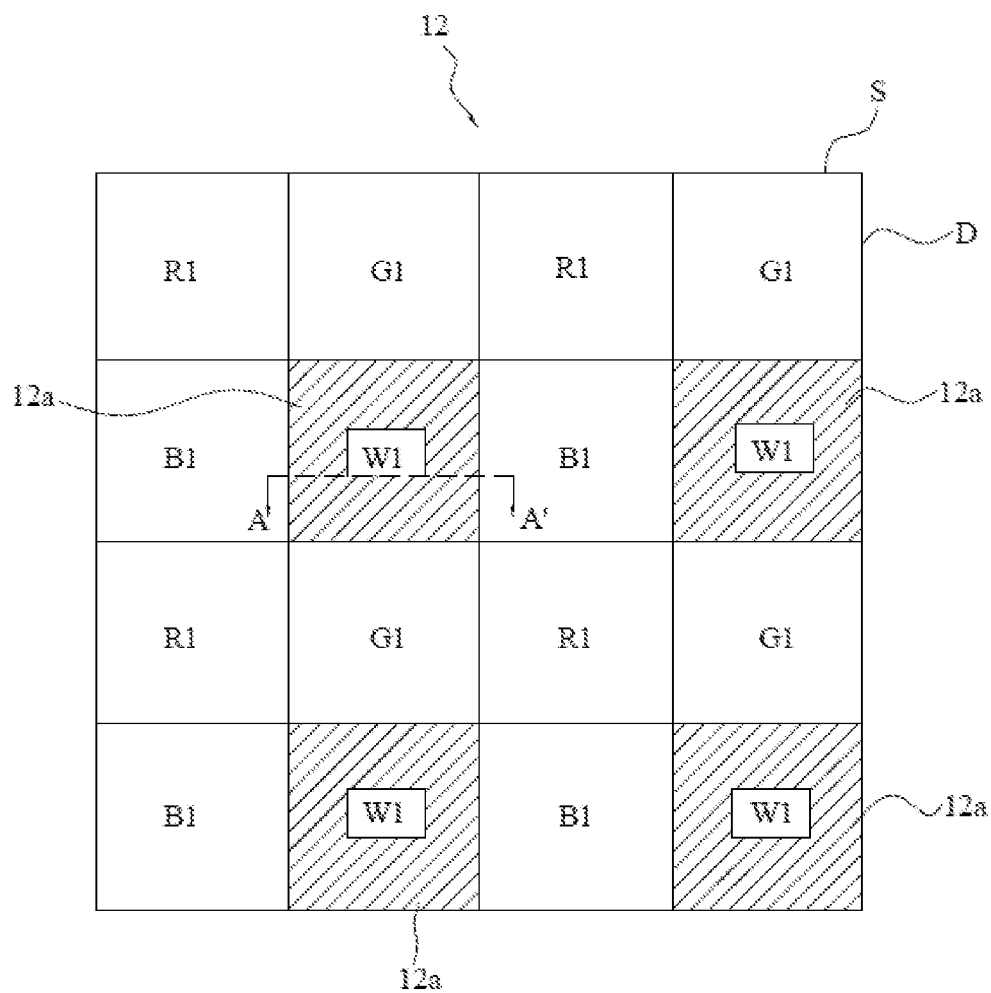
FIG. 3 is a schematic structural diagram of an array substrate according to an embodiment of the present application.

As shown in FIG. 3, the array substrate 12 includes a plurality of data lines D and a plurality of gate lines S vertically arranged, and positional relationship of the data lines D and the gate lines S are corresponding to the black matrix 111 on the color filter substrate 11 (as shown in FIG. 2). The black matrix 111 can block trace areas of the data lines D and the gate lines S to prevent the data lines D and the gate lines S from exposing to the outside. The data lines D and the gate lines S divide the array substrate 12 into a plurality of sub-pixel areas, each of the sub-pixel areas corresponds to one of the red color resistance, the green color resistance, the blue color resistance, and white color resistance disposed on the color filter substrate. One of the sub-pixel areas corresponding to the red color resistance R is defined as a first sub-pixel area R1, one of the sub-pixel areas corresponding to the green color resistance G is defined as a second sub-pixel area G1, one of the sub-pixel areas corresponding to the blue color resistance B is defined as a third sub-pixel area B1, and one of the sub-pixel areas corresponding to the white color resistance W is defined as a fourth sub-pixel area W1. The fourth sub-pixel area W1 is provided with a heating layer 12a configured to heat the liquid crystal layer 13 (as shown in FIG. 1) to prevent the liquid crystal in the liquid crystal layer 13 having crystalline abnormality at low temperature, and thus lead to liquid crystal display panel displaying abnormalities.

It should be noted, the heating layer 12a is connected to the heating control module. The heating control module can be disposed on a non-display area of the liquid crystal display panel. When the liquid crystal display panel is operated in a low-temperature environment, the heating control module controls the heating of the heating layer 12a to heat the liquid crystal layer 13 to ensure the normal operation of the liquid crystal display panel.

It should be understood that, in a liquid crystal display panel including red, green, blue, and white color resistances, the white resistances are uniformly distributed in the display area of the liquid crystal display panel. In the present application, the heating layer is disposed in a region corresponding to the white resistance, which realizes uniform heating of the liquid crystal layer, and the heating area is large, and the heating efficiency is high.

It should be noted, each white color resistance region provided with the heating layer is a non-light emitting region, and a displaying screen therein of the display panel can be achieved by a mixed light of red, green, and blue emitted by the red, the green, and the blue color resistances. Accordingly, the heating layer disposed on the region corresponding to the white color resistance provided by the present application does not affect the function of the displaying of the liquid crystal display panel.

Figure 4:
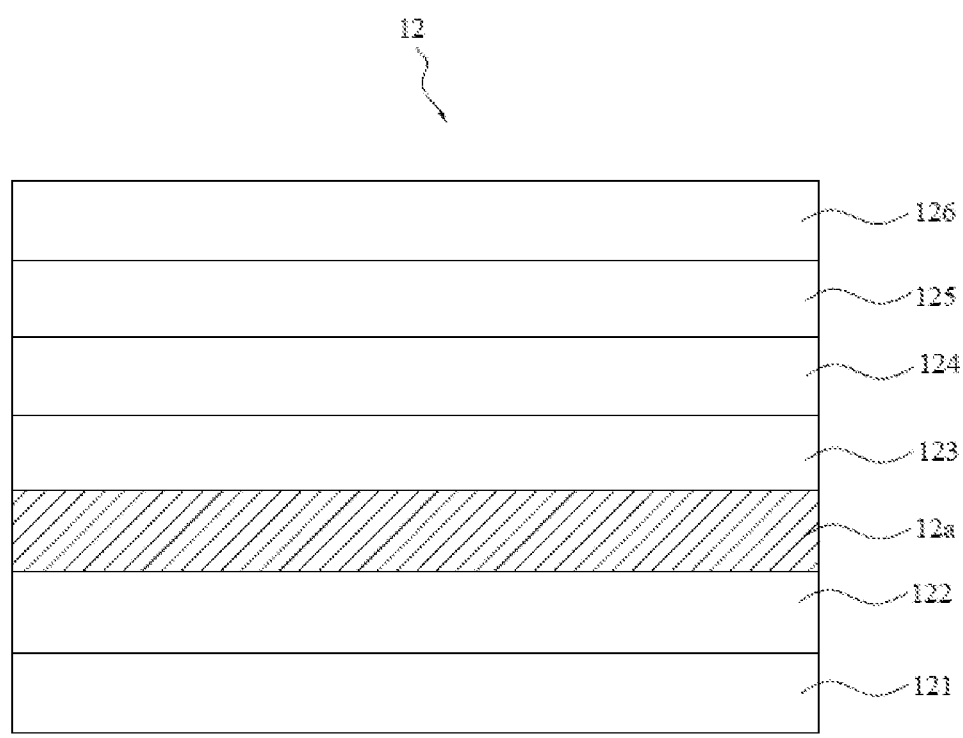
FIG. 4 is a schematic cross-sectional view of the array substrate along A-A' shown in FIG. 3.

According to an embodiment of the present application, as shown in FIG. 4, the array substrate 12 includes a substrate 121, a trace layer 122 disposed on the substrate 121, a first passivation layer 123 disposed on the trace layer 122, a first electrode layer 124 disposed on the first passivation layer 123, a second passivation layer 125 disposed on the first electrode layer 124, and a second electrode layer 126 disposed on the second passivation layer 125. The first electrode layer 124 is configured to provide a first electric field, the second electrode layer 126 is configured to provide a second electric field, and the liquid crystal in the liquid crystal layer 13 (as shown in FIG. 1) is deflected by the first electric field and the second electric field, thereby causing the liquid crystal display panel to display different screens.

Alternatively, the heating layer 12a is disposed under the first electrode layer 124. The first electrode layer 124 can shield the electric field of the heating layer 12a, and prevent the electric field of the heating layer 12a from affecting the liquid crystal layer 13 (as shown in FIG. 1). Preferably, the heating layer 12a is disposed between the first passivation layer 123 and the trace layer 122, and the first passivation layer 123 separates the heating layer 12a from the first electrode layer 124 so that the first electrode layer 124 provides a better shielding effect on the electric field of the heating layer 12a.

Alternatively, the trace layer 122 includes the gate lines S, the data lines D (as shown in FIG. 3), and a plurality of thin film transistors connected to the gate lines S and the data lines D. The gate lines S, the data lines D, and the thin film transistors are insulated from the heating layer 12a.

Figure 5:
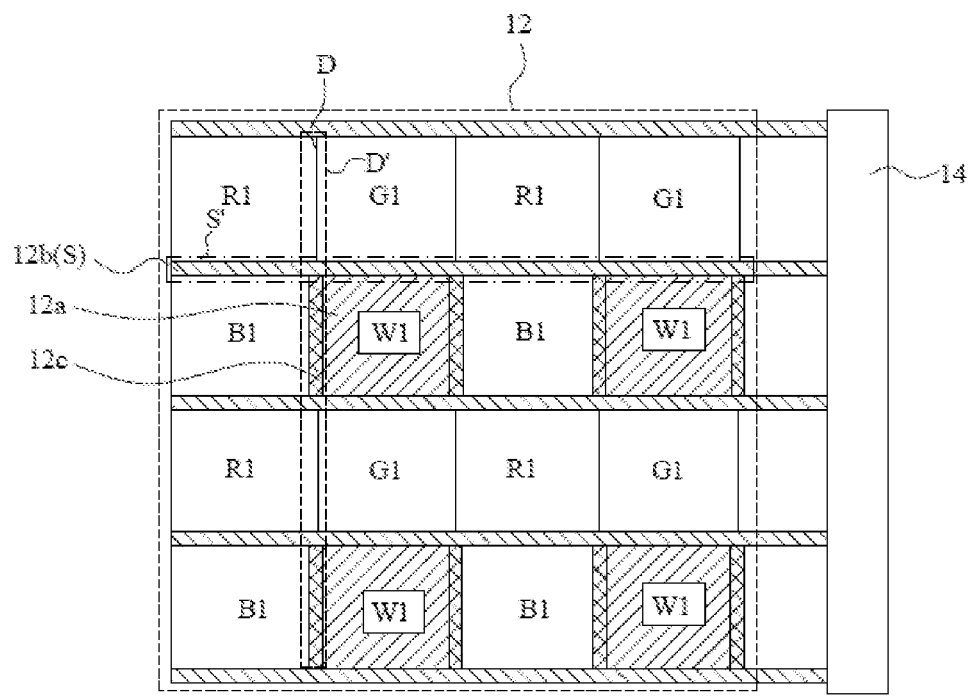
FIG. 5 is a schematic structural diagram of an array substrate according to an embodiment of the present application, including a heating layer 12a, a first heating traces 12b and a second heating traces 12c, and the heating layer 12a completely covered a fourth sub-pixel area W1.

According to an embodiment of the present application, as shown in FIG. 5, the array substrate 12 further includes a first heating traces 12b and a second heating traces 12c. The first heating traces 12b is disposed in parallel with the gate lines S, and a width of the each of first heating traces 12b is less than or equal to a width of a trace area of each of the gate lines S', thereby ensuring the first heating traces 12b does not affect an aperture ratio of the liquid crystal display panel. The second heating traces 12c is disposed in parallel with the data lines D, and a width of each of the second heating traces 12c is less than or equal to a width of a trace area of each of the data lines D', thereby ensuring the second heating traces 12c does not affect the aperture ratio of the liquid crystal display panel.

It should be noted that the trace area of each of the gate lines S' is a wiring region of the gate lines S, the trace area of each of the data lines D' is a wiring region of the data lines D, and the trace area of each of the gate lines S' and the trace area of each of the data lines D' correspond to the black matrix 111 (as shown in FIG. 2). The black matrix 111 shades the trace area of each of the gate lines S' and the trace area of each of the data lines D', and prevents the gate lines S, the data lines D, the first heating line 12b, and the second heating traces 12c from exposing to the outside.

In the array substrate provided by the embodiments of the present application, the first heating traces and the second heating traces are added on a basis of an original heating layer, so that area of a heating region on the array substrate is increased, and distribution of the heating region is more uniform, which has a better heating effect on the liquid crystal layer.

According to an embodiment of the present application, as shown in FIG. 5, the heating layer 12a completely covers the fourth sub-pixel area W1 to achieve an optimal heating effect. The fourth sub-pixel area W1 is an opaque area, and the fourth sub-pixel area W1 does not function on the displaying screen of the liquid crystal display panel, and the displaying screen of the liquid crystal display panel is implemented by the first sub-pixel area R1, the second sub-pixel area G1, and the third sub-pixel area B1. It should be understood that a full color displaying of the liquid crystal display panel can be realized by adjusting the red, the green and the blue sub-pixels of the liquid crystal display panel. Therefore, the fourth sub-pixel area W1 is disposed as a non-emitting area which does not affect a displaying function of the liquid crystal display panel.

It should be understood that the liquid crystal display panel includes a display area and a non-display area disposed at an edge of the display area. The display area is used for displaying screens and the non-display area is used to disposed components without the displaying function, such as various circuit control elements, and the like.

Alternatively, the first heating traces 12b extend through the display area of the liquid crystal display panel and are connected to the heating control module 14 on the non-display area of the liquid crystal display panel, and the heating control module 14 controls a heating function of the first heating traces 12b.

Alternatively, the second heating traces 12c are disposed along an edge of the heating layer 12a and are connected between two adjacent first heating traces 12b, and the second heating traces 12c remain connected to the heating layer 12a and the first heating traces 12b. The heating control module 14 controls the heating function of the second heating traces 12c and the heating layer 12a through the first heating traces 12b.

Figure 6:
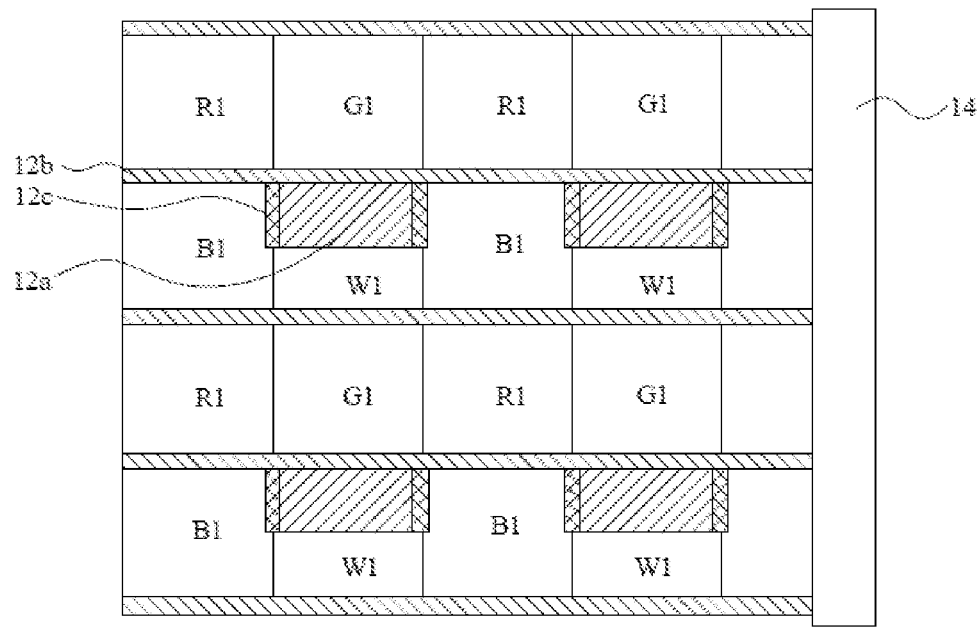
FIG. 6 is a schematic structural diagram of an array substrate according to an embodiment of the present application, including a heating layer 12a, a first heating traces 12b and a second heating traces 12c, and the heating layer 12a partially covered a fourth sub-pixel area W1.

According to an embodiment of the present application, as shown in FIG. 6, the heating layer 12a partially covers the fourth sub-pixel area W1. The area of the fourth sub-pixel area W1 covered by the heating layer 12a is an opaque area. The area of the fourth sub-pixel area W1 not covered by the heating layer 12a is a normal light-transmission area. The normal light-transmission area can provide white light to the displaying screen of the liquid crystal display panel to enhance the brightness of the liquid crystal display panel. It should be understood that although a part of the fourth sub-pixel area W1 is an opaque area, it does not affect the function of the displaying screen of the liquid crystal display panel, and the liquid crystal display panel can be adjusted by the red, the green, and the blue three color sub-pixels to achieve full color displaying.

Alternatively, the first heating traces 12b extend through the display area of the liquid crystal display panel and are connected to the heating control module 14 on the non-display area of the liquid crystal display panel, and the heating control module 14 controls the heating function of the first heating traces 12b.

Alternatively, the second heating traces 12c are disposed along an edge of the heating layer 12a and is connected to the heating layer 12a. At least one end of each of the second heating traces 12c is connected to the first heating traces 12b. The heating control module 14 controls the heating function of the heating layer 12a and the second heating traces 12c through the first heating traces 12b.

Alternatively, the heating layer 12a, sides of the heating layer 12a, the first heating traces 12b, and the second heating traces 12c facing the liquid crystal layer 13 (as shown in FIG. 1) are black to reduce the reflection effect of the heating layer 12a, the first heating trace 12b, and the second heating trace 12c on light. Alternatively, the black matrix 111 (as shown in FIG. 2) completely blocks the heating layer 12a, the first heating traces 12b, and the second heating traces 12c to prevent the heating layer 12a, the first heating traces 12b, and the second heating traces 12c from exposing to the outside.

According to an embodiment of the present application, as shown in FIGS. 1 and 5, the liquid crystal display panel further includes a temperature sensor 15 for detecting a temperature of the liquid crystal layer 13. The temperature sensor 15 is connected to the heating control module 14.

Figure 8:
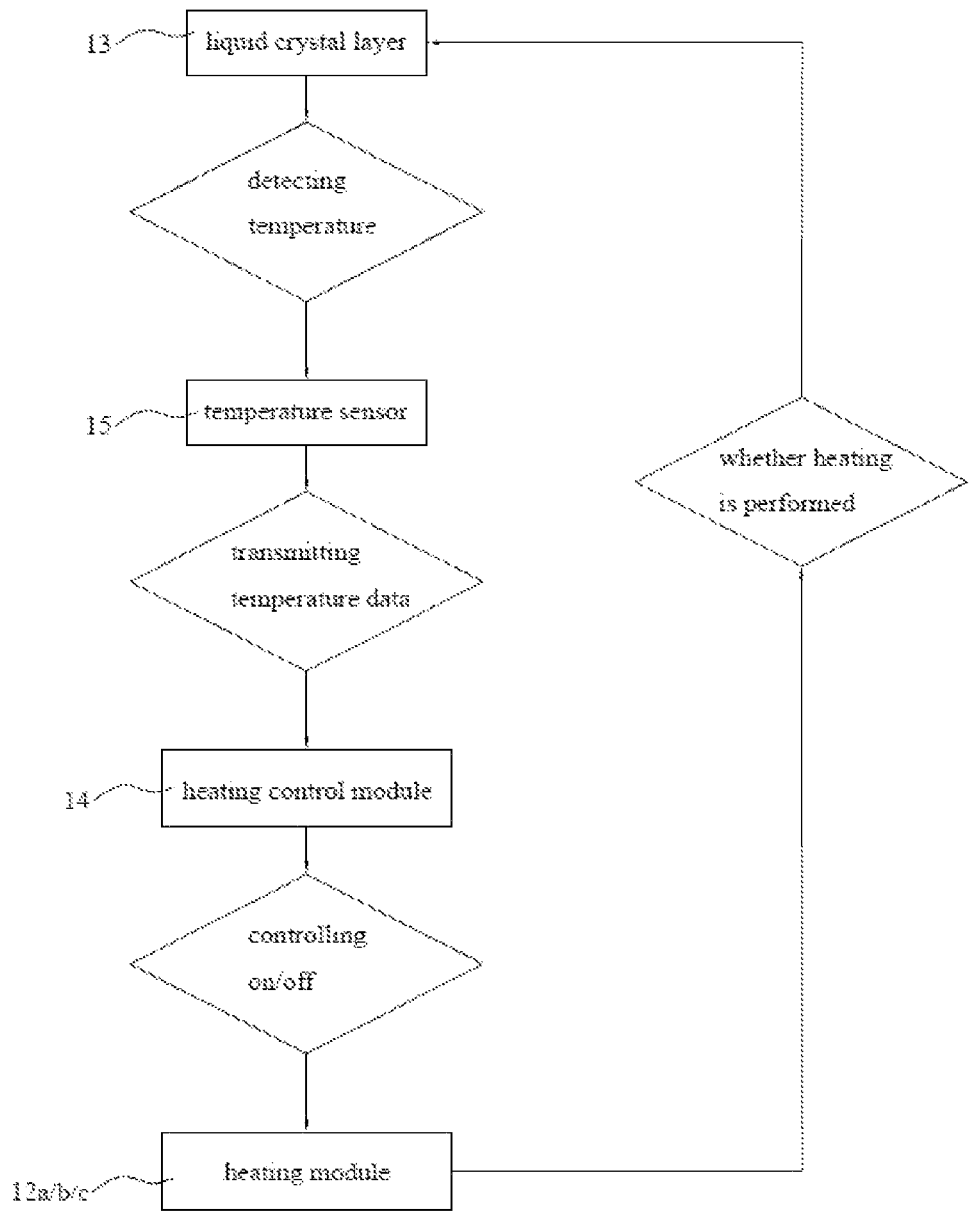
FIG. 8 is a flow chart of heating a liquid crystal layer by a heating module according to an embodiment of the present application.

A flow of the heating control module 14 controls the heating module to heat the liquid crystal layer 13 as shown in FIG. 8. It should be noted that the heating module 12a/b/c shown in FIG. 8 includes the heating layer 12a, the first heating traces 12b, and the second heating traces 12c (as shown in FIG. 5). As shown in FIG. 8, the temperature sensor 15 detects the temperature of the liquid crystal layer 13, and transmits an obtained temperature data to the heating control module 14, and the heating control module 14 determines the temperature data, and further controls the heating module 12a/b/c whether heating is performed on the liquid crystal layer 13 or not.

Specifically, the heating control module 14 determines the temperature data which is by setting a temperature threshold, and the heating control module 14 determines a magnitude relationship between the temperature data and the temperature threshold. If the temperature data is less than or equal to the temperature threshold, the heating module 12a/b/c is turned on. If the temperature data is greater than the temperature threshold, the heating module 12a/b/c is turned off. Alternatively, the temperature threshold can be a crystallization temperature value of the liquid crystal or a value greater than a liquid crystal crystallization temperature value. Alternatively, the temperature threshold can be a segmentally set temperature range, and the heating control module 14 controls a heating power of the heating module 12a/b/c according to the relationship between the temperature data and the temperature range. For example, the crystallization temperature of the liquid crystal is T1, T0~T1 is set as a first temperature threshold, T1~T2 is a second temperature threshold, and greater than the T2 is set as a third temperature threshold, wherein T0<T1<T2. The heating power of the heating module 12a/b/c when the temperature data is within the first temperature threshold is greater than the heating power of the heating module 12a/b/c when the temperature data is within the second temperature threshold. When the temperature data is within the third temperature threshold, the heating module 12a/b/c stop heating. The liquid crystal layer heating scheme provided in this embodiment can realize real-time monitoring of the temperature of the liquid crystal layer.

Alternatively, the temperature sensor 15 is disposed between the liquid crystal layer 13 and the color filter substrate 11.

Figure 7:
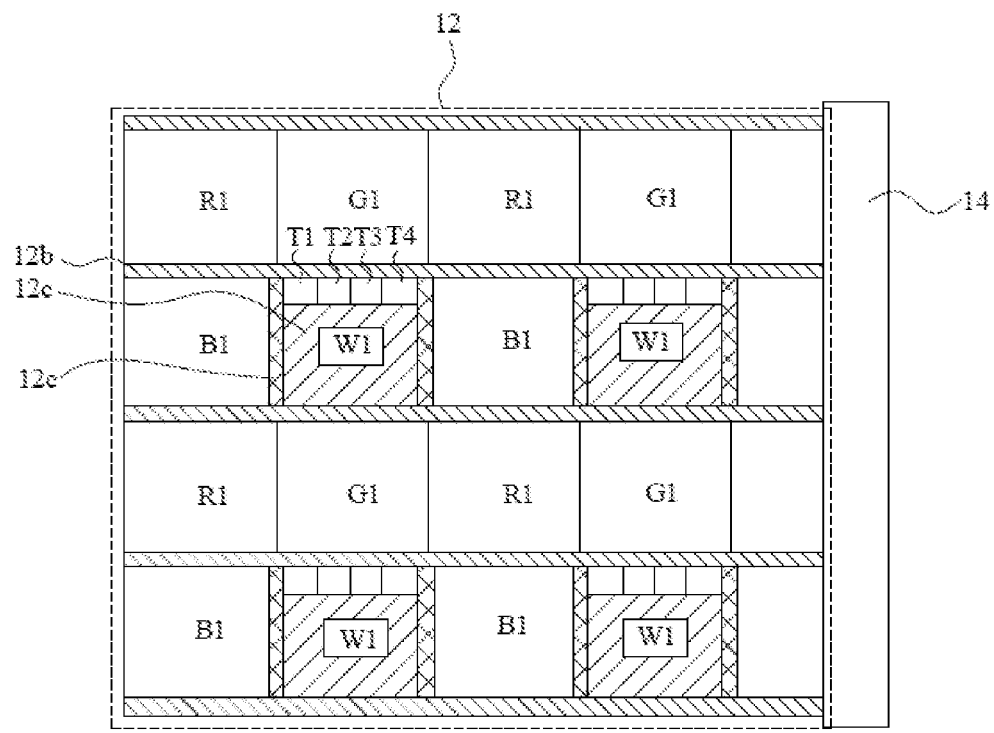
FIG. 7 is a schematic structural diagram of an array substrate according to an embodiment of the present application, including a thin film transistor disposed in a fourth sub-pixel area W1.

According to an embodiment of the present application, as shown in FIG. 7, the trace layer 122 (as shown in FIG. 4) of the array substrate 12 includes thin film transistors. The first sub-pixel area R1 is connected to the first thin film transistor T1, the second sub-pixel area G1 is connected to the second thin film transistor T2, the third sub-pixel area B1 is connected to the third thin film transistor T3, and the fourth sub-pixel area W1 is connected to the fourth thin film transistor T4. The first thin film transistor T1, the second thin film transistor T2, the third thin film transistor T3, and the fourth thin film transistor T4 are all disposed in the fourth sub-pixel area W1, thereby improving the aperture ratios of the first sub-pixel area R1, the second sub-pixel area G1, and the third sub-pixel area B1.

Alternatively, the first thin film transistor T1, the second thin film transistor T2, and the third thin film transistor T3 are disposed in the fourth sub-pixel area W1 which is closest to the first sub-pixel area R1, the second sub-pixel area G1, and the third sub-pixel area B1, a wiring length of the thin film transistor connected to the corresponding sub-pixel area thereto is reduced.

Alternatively, a vertical projection of the heating layer 12a on the trace layer 122 (as shown in FIG. 4) does not coincide with an area occupied by the first thin film transistor T1, the second thin film transistor T2, the third thin film transistor T3, and the fourth thin film transistor T4 on the trace layer, to reduce an influence of heating electric field of the heating layer 12a on the thin film transistors.

Alternatively, the heating layer 12a, materials of the first heating traces 12b, and the second heating traces 12c are metal, preferably silver or molybdenum, to ensure the heating layer 12a, the first heating traces 12b, and the second heating traces 12c have good heat generation capability.

In summary, the liquid crystal display panel provided by the embodiments of the present invention can uniformly heat the liquid crystal layer of the liquid crystal display panel by providing a heating layer, a first heating traces, and a second heating traces on the array substrate. It solves the problem that the liquid crystal display panel exhibits undesirable phenomena such as smear due to abnormal liquid crystal state when operating in a low-temperature environment.

Embodiments of the present invention have been described, but not intending to impose any unduly constraint to the appended claims. For a person skilled in the art, any modification of equivalent structure or equivalent process made according to the disclosure and drawings of the present invention, or any application thereof, directly or indirectly, to other related fields of technique, is considered encompassed in the scope of protection defined by the claims of the present invention.

What is claimed is:

1. A liquid crystal display panel, comprising:
   a color filter substrate comprising a red color resistance, a green color resistance, a blue color resistance, and a white color resistance arranged in an array;
   an array substrate disposed opposite to the color filter substrate, wherein the array substrate comprises a plurality of data lines and a plurality of gate lines vertically arranged, the data lines and the gate lines divide the array substrate into a plurality of sub-pixel areas, each of the sub-pixel areas corresponds to one of the red color resistance, the green color resistance, the blue color resistance, and white color resistance disposed on the color filter substrate, wherein one of the sub-pixel areas corresponding to the red color resistance is defined as a first sub-pixel area, one of the sub-pixel areas corresponding to the green color resistance is defined as a second sub-pixel area, one of the sub-pixel areas corresponding to the blue color resistance is defined as a third sub-pixel area, and one of the sub-pixel areas corresponding to the white color resistance is defined as a fourth sub-pixel area; and
   a liquid crystal layer disposed between the array substrate and the color filter substrate;
   wherein the fourth sub-pixel area is provided with a heating layer; the array substrate further comprises a plurality of first heating traces and a plurality of second heating traces; the heating layer, the first heating traces, and the second heating traces are configured to heat the liquid crystal layer;
   wherein the first heating traces go through a display area of the liquid crystal display panel, the second heating traces are disposed along an edge of the heating layer, and the heating layer and the second heating traces are connected to the first heating traces;
   wherein the heating layer completely covers the fourth sub-pixel area.

2. The liquid crystal display panel according to claim 1, wherein the array substrate comprises:
   a substrate;
   a trace layer disposed on the substrate, wherein the trace layer comprises the gate lines, the data lines, and a plurality of thin film transistors connected to the gate lines and the data lines;
   a first passivation layer disposed on the trace layer;
   a first electrode layer disposed on the first passivation layer and configured to provide a first electric field;
   a second passivation layer disposed on the first electrode layer;
   a second electrode layer disposed on the second passivation layer and configured to provide a second electric field; and
   the heating layer disposed between the first passivation layer and the trace layer.

3. The liquid crystal display panel according to claim 2, wherein each of the first heating traces is disposed in parallel with the gate lines, and each of the second heating traces is disposed in parallel with the data lines.

4. The liquid crystal display panel according to claim 3, wherein a width of the each of first heating traces is less than or equal to a width of a trace area of each of the gate lines, and a width of each of the second heating traces is less than or equal to a width of a trace area of each of the data lines.

5. The liquid crystal display panel according to claim 4, wherein the color filter substrate further comprises a black matrix disposed at a boundary between the red color resistance, the green color resistance, the blue color resistance, and the white color resistance, and the black matrix covers the trace area of each of the gate lines and the trace area of each of the data lines.

6. The liquid crystal display panel according to claim 3, wherein the first heating traces, the second heating traces, and the heating layer are in the same layer of the array substrate.

7. The liquid crystal display panel according to claim 1, wherein the second heating traces are connected between two adjacent first heating traces.

8. The liquid crystal display panel according to claim 3, further comprising a heating control module, and the heating layer, the first heating traces, and the second heating traces are connected to the heating control module.

9. The liquid crystal display panel according to claim 8, wherein the heating control module is disposed in a non-displaying area of the liquid crystal display panel.

10. The liquid crystal display panel according to claim 8, further comprising a temperature sensor configured to detect a temperature of the liquid crystal layer.

11. The liquid crystal display panel according to claim 10, wherein the temperature sensor is connected to the heating control module, and the heating control module is configured to control the heating layer, the first heating traces, and the second heating traces to perform a heating operation according to a temperature data detected by the temperature sensor.

12. The liquid crystal display panel according to claim 10, wherein the temperature sensor is disposed between the liquid crystal layer and the color filter substrate.

13. The liquid crystal display panel according to claim 3, wherein sides of the heating layer, the first heating traces, and the second heating traces facing the liquid crystal layer are black.

14. The liquid crystal display panel according to claim 2, wherein each of the thin film transistors is disposed in the fourth sub-pixel area.

15. The liquid crystal display panel according to claim 14, wherein a vertical projection of the heating layer on the trace layer does not coincide with an area occupied by the thin film transistors on the trace layer.

16. The liquid crystal display panel according to claim 3, wherein materials of the heating layer, the first heating traces, and the second heating traces are metal.

* * * * *